Patented Sept. 10, 1935

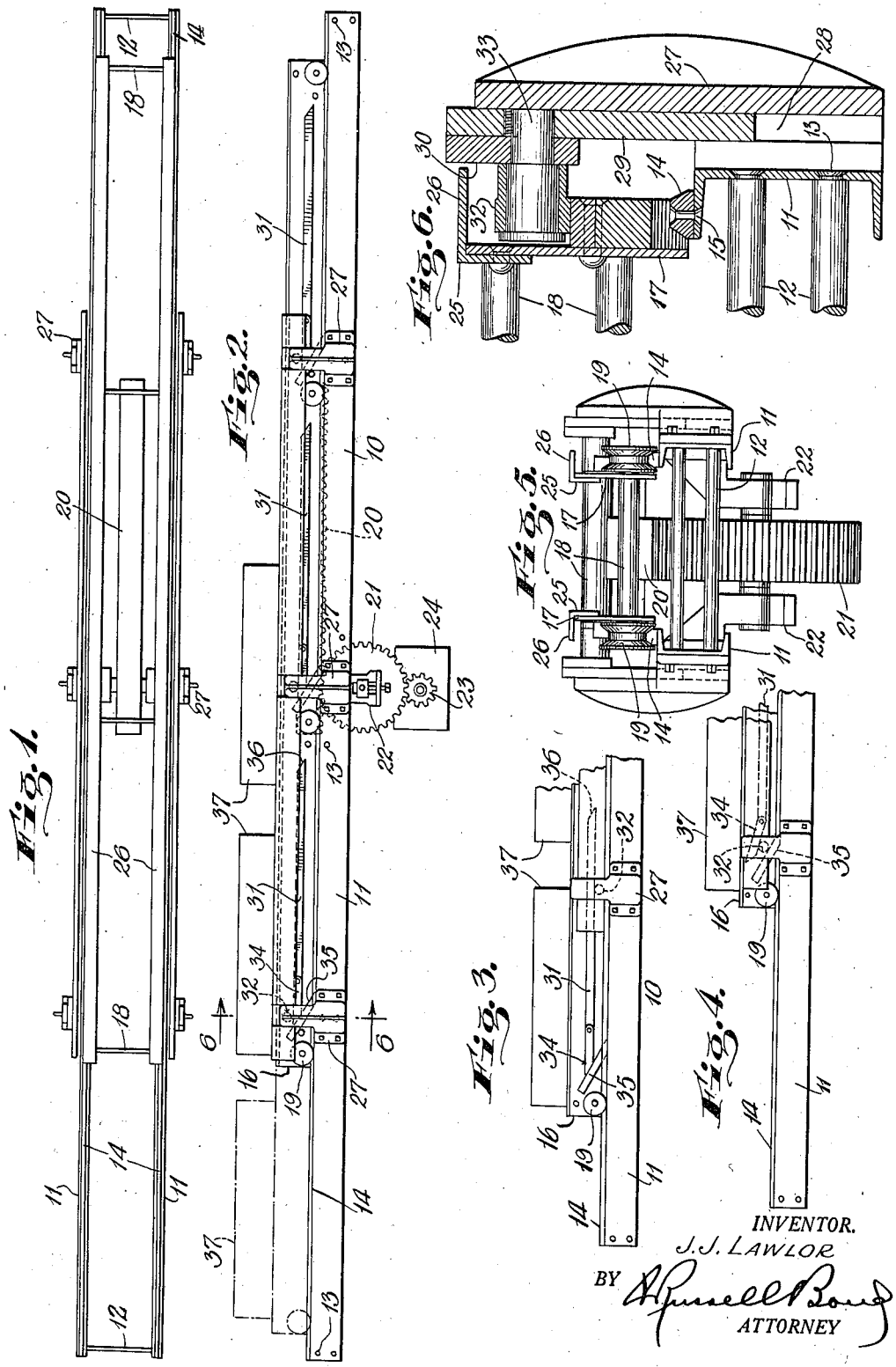

2,013,858

UNITED STATES PATENT OFFICE 2,013,858

CONVEYER

John J. Lawlor, Plainfield, N. J., assignor to General Foundry Machinery Corporation, Wilmington, Del., a corporation of Delaware Application September 12, 1934, Serial No. 743,682

7 Claims. (Cl. 198—218)

My invention relates to improvements in conveyers and has for an object to provide a very simple and inexpensive mechanism for transporting a load.

A specific object of my invention is to provide a conveyer which will move a load, step by step, away from a receiving point.

Another object of the invention is to provide a conveyer which will advance a load by stages which may be synchronized with the operation of a machine to carry off the output of the machine.

My conveyer is adapted, particularly, for use with a molding machine to receive the flasks or molds from the machine and the operation of the conveyer may be timed to advance each flask or mold while the next one is being prepared in the molding machine so that there will always be room on the conveyer for each flask as soon as the mold therein is completed. The conveyer is thus virtually a part of the molding machine and serves to carry off the output of the machine as fast as it is produced, carrying the flasks to a point of delivery, or else serving as a temporary storage device for the machine.

In the handling of molds and particularly of molds stripped of their flasks great care must be taken against shocks and jars. It is an object of my invention to provide a conveyer particularly adapted for the gentle handling of loads it carries.

While my conveyer is peculiarly adapted for use in foundries, my invention is not limited to such use, but is applicable to a great variety of uses and may be employed either to take care of the output of machines or for other purposes where loads are to be transported.

To illustrate how the above-named and other objects are attained, I shall now describe a specific embodiment of my invention in connection with the accompanying drawing and thereafter the novelty and scope of my invention will be pointed out in the claims.

In the accompanying drawing;

Figure 1 is a plan view of my improved conveyer;

Fig. 2 is a side elevation of the same;

Fig. 3 is a fragmentary view on an enlarged scale, illustrating certain switch mechanism;

Fig. 4 is a similar view with the parts in a different position;

Fig. 5 is an end elevation of the conveyer on an enlarged scale; and

Fig. 6 is an enlarged view in section taken on the line 6—6 of Fig. 2.

My conveyer comprises a bed 10 consisting of a pair of parallel channel beams 11 each lying on one flange with the web thereof in vertical position and with the flanges of each beam turned inward or toward the other beam. The beams are held in mutually spaced relation by means of spacer bars or rods 12 which are riveted to the beams at each end, as indicated at 13, in Fig. 6. Supported on the upper flange of each beam is a rail or track member 14 which is secured to the flange by rivets 15. These rails serve as tracks on which runs a carriage 16.

The carriage comprises a pair of frame plates 17 connected by spacer rods 18 which may be riveted to the plates in the same manner as the rods 12 are riveted to the channel beams. The carriage is supported on double flanged wheels or rollers 19, journaled upon the plates. These rollers fit over and ride upon the tracks 14. Mounted on the carriage and supported by the rods 18 between the frame plates 17, is a rack 20. This rack meshes with a driving gear 21 journaled in brackets 22 depending from the beams 11. A driving pinion 23 meshes with the gear 21 and is driven by a source of power (not shown) through suitable reversing gear contained in a housing 24 below the bed of the conveyer. Thus, by reason of the reversing gear, the carriage will be reciprocated along the tracks 14. To provide a suitable support for the load which is to be borne by the carriage, angle bars 25 are mounted on the plates 17, and each angle bar has one flange 26 lapping over the top of the plate and extending horizontally outward, as clearly shown in Figs. 5 and 6.

Bolted at suitable space intervals on the beams 11 are brackets 27. Each bracket is formed with a vertical guideway 28 adapted to receive a vertical slide plate 29. Secured to the slide plates are longitudinal plates 30, there being a plate at each side of the carriage. The two plates 30 just clear the flanges 26 and, as will be explained presently, serve intermittently as supports for the load transported by the conveyer. Means are provided for raising and lowering the slide plates, so that when the carriage is traveling forward, that is, toward the right, as shown in Fig. 2 the upper edge of each plate or support 30 will lie below the flanges 26 and on reverse movement of the carriage the supports 30 will be raised slightly above the level of the flanges.

To effect the vertical movement of the supports 30 each of the frame plates 17 of the carriage is provided on its outer face with a plurality of rail sections 31 and each of the supports 30 is provided with rollers 32 adapted to ride on the rail sections. The rollers are journaled on pins 33 which are secured to the plates 29 and 30, as shown in Fig. 6. Pivoted at the rear end (that is the left hand end, as viewed in Fig. 2) of each rail section is a switch arm 34, the free end of which normally rests on an inclined bar 35. The bars 35 are secured rigidly to the plate 17 and extend above and below the rail sections 31. The forward end of each rail is preferably tapered or beveled off as indicated at 36 and a space is provided between the forward end of each rail and the next adjacent bar 35. The stroke of the carriage 16 as it is reciprocated along the tracks 14 is slightly greater than that of each track section 31 with its pivoted switch arm 34 and it will be understood that there is a roller 32 for each track section 31.

The carriage 16 reciprocates between the position shown in broken lines in Fig. 2 and that shown in full lines. While the carriage is moving forward, that is toward the right, the rollers 32 will pass under the rail sections 31 and the supports 30 will be in lowered position. However, as the carriage advances to the position shown in Fig. 4, the rollers 32 will engage the inclined bars 35 and will be forced upward by said bars, as shown in Fig. 4, lifting the supports 30. As the rollers ride upward the pivoted switch arms 34 will be swung upward until the rollers 32 clear them, when they will drop by gravity back of the rollers, so that on the return movement of the carriage the rollers will be compelled to ride on the switch arms and upon the top of the rails 31. The loads 37 carried by the conveyer are wide enough to project beyond the flanges 26 and overlie the supports 30, so that when the supports 30 are raised by coaction of the rollers 32 with the inclined bars 35, the load 37 will be lifted off the carriage by the supports 30. In this raised position the load will be held, while the carriage is moving back toward the left hand end of the bed, until the rollers come to the tapered ends 36 of the rail sections 31, when they will ride down these tapered ends and deposit the load again upon the carriage. Because of this taper, the load will be very gently deposited upon the carriage and after the ends of the rail sections have been cleared the rollers will drop below the rails 31, so that upon the next advance of the carriage they will ride under the rails, as explained above.

The operation of the conveyer will now be clear. A load 37 is deposited on the carriage 16 while the latter is in the retracted position shown by broken lines in Fig. 2. The supports 30 will be in their lowered position as the carriage moves forward, as shown in Fig. 3, and the load will be carried over the supports. But as the carriage nears the end of its stroke, the supports 30 will be raised, as shown in Fig. 4, and will support the load while the carriage is on its reverse stroke. Just before the next forward stroke the supports will lower the load upon the carriage, and the latter will move the load forward, as indicated in Fig. 3. Thus, the load will be carried forward, step by step, with each complete reciprocation of the carriage. The length of these steps is greater than that of the load so that each load 37 will be moved out of the way of the next successive load. The rate at which the carriage moves forward may be timed to the operation of a machine and the conveyer will then be so placed that the machine will deposit a load on the supports 30 at each reverse stroke of the carriage. It will be understood that the conveyer may be of any length desired and that the carriage will be of such length as to transport simultaneously a number of successive loads. Thus, the conveyer may be used to store a number of loads which may be taken off at various points along its length, or it may be used merely to deliver the loads to some delivery or distribution station.

While I have described my invention in specific detail, it will be understood that the particular embodiment described should be taken as illustrative and not as limitative of my invention and that I consider myself at liberty to make such variations in construction and arrangement of parts as fall within the spirit and scope of the following claims.

I claim:

1. A conveyer comprising a bed, a carriage adapted to carry a load, means for reciprocating the carriage, a support at each side of the carriage and mounted to slide vertically with respect to the bed to raise the load off the carriage and alternately deposit the load on the carriage, and means on the carriage for controlling the vertical reciprocation of the supports in timed relation to the reciprocation of the carriage.

2. A conveyer comprising a vertically reciprocable support member and a carriage member reciprocable transversely with respect to the movement of the support member, one of said members being formed with a guide rail and the other with a supporting roller adapted to travel upon the guide rail during each rearward stroke and below the guide rail during each forward stroke of the carriage member, and means for switching the roller to the top of the rail at the end of each forward stroke of the carriage member.

3. A conveyer comprising a carriage, means for reciprocating the same, a support adjacent the carriage and mounted to move vertically with respect to the carriage, a rail on the carriage of shorter length than the stroke of the carriage, a supporting roller journaled on the support and adapted to ride on the rail during each rearward stroke of the carriage and below the rail during each forward stroke thereof, and means for switching the roller to the top of the rail at the end of each forward stroke.

4. A conveyer comprising a carriage, means for reciprocating the same, a support adjacent the carriage and mounted to move vertically with respect to the carriage, a rail on the carriage of shorter length than the stroke of the carriage, a supporting roller journaled on the support and adapted to ride on the rail during each rearward stroke of the carriage and below the rail during each forward stroke thereof, and means for switching the roller to the top of the rail at the end of each forward stroke, the forward end of the rail being tapered to permit gradual lowering of the support at the end of each rearward stroke.

5. A conveyer comprising a carriage adapted to bear a load, means for reciprocating the carriage, a support adjacent the carriage and mounted to move vertically with respect to the carriage, a rail on the carriage of shorter length than the stroke of the carriage, a supporting roller journaled on the support and adapted to ride on the rail during each rearward stroke of the carriage and below the rail during each forward movement thereof, and means for switching the roller to the top of the rail at the end of each forward stroke, the switching means comprising a switch arm hinged at the rear end of the rail, and a member providing an inclined surface serving to guide the roller up and over the switch arm to the top of the rail.

6. A conveyer comprising a bed provided with a track, a carriage adapted to travel on the track, said carriage being narrower than the load it is adapted to carry, means for reciprocating the carriage, a support immediately adjacent opposite sides of the carriage and movable vertically with respect to the bed, and means on the carriage for lifting the supports and keeping the same in lifted position to hold said load clear of the carriage during reverse movement of the latter.

7. A conveyer comprising a bed provided with a track, a carriage reciprocable on the track, guide brackets mounted on the bed, supports immediately adjacent opposite sides of the carriage and slidable vertically in the guide brackets, a plurality of rollers on each support, a plurality of rails on the carriage, there being a rail for each roller, and means for raising the rollers and supporting them on the rails during reverse movement of the carriage to raise the supports above the level of the carriage, the rails being shorter than the stroke of the carriage whereby at the end of each forward movement, the rollers will drop off the rails and permit the supports to be lowered by gravity below the level of the carriage.

JOHN J. LAWLOR.